(12) United States Patent
Carpenter et al.

(10) Patent No.: US 7,577,860 B2
(45) Date of Patent: Aug. 18, 2009

(54) PROCESSOR SPECIFIC BIOS INTERFACE FOR POWER MANAGEMENT

(75) Inventors: Todd L. Carpenter, Monroe, WA (US); Allen Marshall, Woodinville, WA (US); Andrew J. Ritz, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 11/328,010

(22) Filed: Jan. 9, 2006

(65) Prior Publication Data
US 2007/0162776 A1 Jul. 12, 2007

(51) Int. Cl.
G06F 1/32 (2006.01)
G06F 1/00 (2006.01)

(52) U.S. Cl. .................. 713/320; 713/300; 713/322
(58) Field of Classification Search .......... 713/300, 713/320, 322
See application file for complete search history.

(56) References Cited

U.S. PATENT DOCUMENTS

| | | | |
|---|---|---|---|
| 6,691,236 B1 | 2/2004 | Atkinson | |
| 6,845,456 B1 * | 1/2005 | Menezes et al. | 713/320 |
| 6,889,332 B2 * | 5/2005 | Helms et al. | 713/322 |
| 7,020,786 B2 * | 3/2006 | Vyssotski et al. | 713/300 |
| 2006/0129852 A1 * | 6/2006 | Bonola et al. | 713/300 |

* cited by examiner

Primary Examiner—Suresh K Suryawanshi
(74) Attorney, Agent, or Firm—Wolf, Greenfield & Sacks, P.C.

(57) ABSTRACT

Processor power management capabilities that enable an operating system kernel to interact with a plurality of ACPI-compliant computing devices to manage processor power using a generic processor description. Specifications of power processor management capabilities of processor types are stored in data structures, i.e., objects. Each object contains a control value field and a control mask field. The kernel loads a generic processor driver and objects for each processor type enabling the kernel to respond to power management events such as processor utilization and processor operating temperature events. In response to a power management event, the kernel calculates a desired processor performance state; sets bits in the control mask field to describe the desired processor performance state; and passes the control mask to the generic processor driver which controls the processor. Responses to power management events include adjusting processor voltage and/or adjusting processor frequency.

20 Claims, 5 Drawing Sheets

PROCESSOR SPECIFIC BIOS INTERFACE FOR POWER MANAGEMENT

BACKGROUND

Market requirements, environmental needs, and business costs dictate that computing devices use as little energy as possible while still providing robust computing services. The energy consumed by a computing device can be more efficiently managed by providing enough computational power for each service as needed instead of providing maximum computational power at all times. Computing devices provide services by executing computer program instructions. Computer program instructions are executed by electronic circuitry in computing devices such as laptop, desktop, and mainframe computers, personal digital assistants (PDAs), cellular telephones, etc. The electronic circuitry that executes computer program instructions in a computing device is often contained in a single integrated circuit referred to as a "core." A core is contained in a single physical package often referred to as a "microprocessor" or simply a "processor." Multiple interacting cores may be contained in a single processor.

Most computing devices execute a computer program, referred to as an operating system, that guides the operation of the computing device and provide services to other programs executed by the computing device. Specifically, an operating system controls the allocation and usage of hardware resources such as memory, computing resources, mass memory storage, peripheral devices, etc. The computer instructions essential to initializing and operating the computing device are contained in a component of the operating system often referred to as the "kernel." Shortly after a computing device is started, the kernel begins executing. Because a kernel has direct control of the hardware and has access to current data about the rest of the operating system, a kernel is the ideal software component for regulating computing power and, thus, controlling energy consumption.

A kernel communicates with a processor via a software component referred to as a processor driver. In many operating systems, a processor driver is used to abstract the differences between various processors, and allow the kernel to control a processor's power management features. These power management features may include the ability of the system to adjust the processor's voltage and frequency. Increasing the processor's voltage and/or frequency increases the speed at which the instructions are executed by the processor and increase the power consumption of the processor. Decreasing the processor's voltage and/or frequency decreases the speed at which instructions are executed by the processor and decreases the power consumption of the processor. Controlling a processor's voltage and frequency in order to control instruction execution speed and power consumption is defined in the ACPI specification as a processor performance state. Computing devices containing multiple processors and processors containing multiple cores must often cope with power management dependencies between the processors and cores. For example, in a processor containing-multiple cores, it may be that reducing the voltage of one core requires reducing the voltage of all of the cores.

The power management capabilities and software interface used to invoke power management features varies depending on the processor type. This variation, in the past, has required that a kernel have access to a plurality of processor drivers, one processor driver for each processor type. Preferably, systems with processor power management features conform to the Advanced Configuration and Power Interface (ACPI) specification. ACPI specifies how operating systems may discover the configuration of electronic circuitry, e.g., processors, in computing devices and manage the power usage of computing devices and systems. ACPI defines hardware and software interfaces that enable operating systems to control performance characteristics of computing devices such as processing speed, power consumption, and respond to the system's temperature, etc. ACPI software interfaces are provided by data structures called "software objects." A "software object", i.e., an object, is a data structure that contains data and may or may not also contain functions, or references to functions, that operate on the data contained in the object.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and apparatus, including computer-readable medium, for managing processor performance states that employs an ACPI object that describes power management controls that may differ among processor implementations such that a generic processor driver may be used is disclosed. Managing processor power employing a generic processor driver enables an operating system kernel to more efficiently interact with a plurality of ACPI-compliant computing devices.

The method comprises: a platform providing an ACPI object that describes the processor power management capabilities and interfaces for the system's processor type; identifying the processor type; loading a generic processor driver; and responding to power management events. Periodically, the desired state of the processor is calculated; a control value and control mask that describe the desired state of the processor are read from a control value field and control mask field; and the control value and control mask are passed to the generic processor driver. A status value field and status mask field may also be provided. If a status value field and status mask field are provided, the status mask field and status value fields are used to read and interpret the status of the processor to determine if the appropriate state has been set.

Power management capabilities include, but are not limited to, setting performance states of one processor or a plurality of similar processors or a plurality of similar cores in a processor. Power management events include, but are not limited to, notifications of changes in platform capabilities and system operating temperatures. Responses to power management events include, but are not limited to, re-evaluating current platform capabilities and adjusting processor voltage and/or adjusting processor frequency.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Most computing devices can benefit from power management, i.e., the ability to adjust power consumption as needed. Such computing devices include, but are not limited to, personal computers (PCs), laptop computers, mainframe computers, embedded systems, industrial controllers, personal digital assistants (PDAs), cellular telephones, etc. An exemplary computing device architecture is illustrated in the block diagram shown in FIG. 1. It should be noted that FIG. 1 focuses on the parts of a computing device architecture that have to do with power management. Most, if not all, computing device architectures have additional parts that are not shown in FIG. 1 in order to avoid unduly complicating FIG. 1 and this description.

Figure 1:
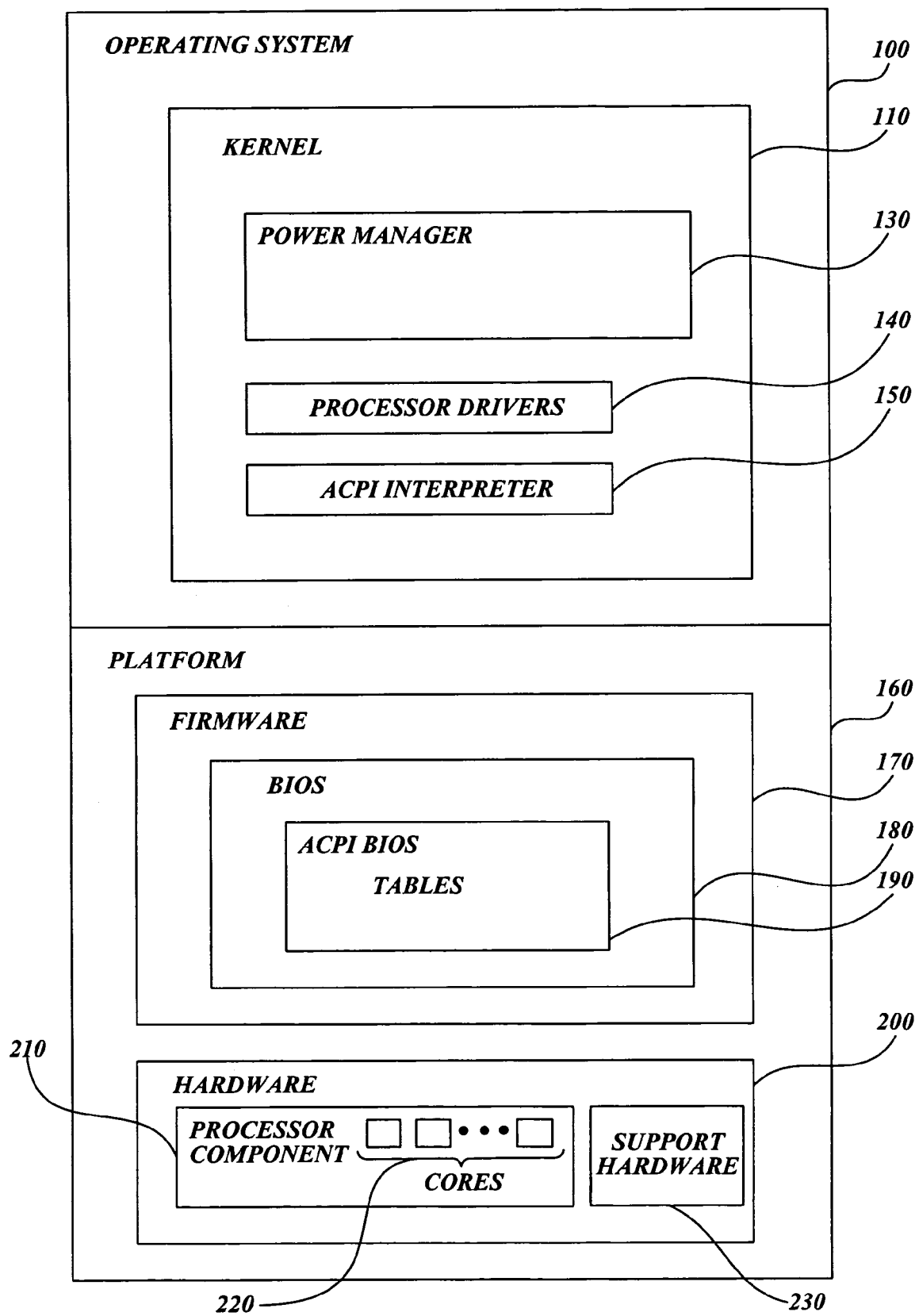
FIG. 1 is a block diagram of an exemplary computing device architecture comprising a platform and an operating system.

The computing device architecture shown in FIG. 1 comprises two main parts, an operating system 100 and a platform 160. The operating system 100 is a set of interacting software components that control the allocation and usage of hardware resources and that are supported by, and executed on, the platform 160. The platform 160 comprises firmware 170 and hardware 200.

The hardware 200 comprises a processor component 210 and support hardware 230. The processor component 210 may comprise one or more processors. Each of the processors in the processor component 210 may comprise one or more cores 220. Support hardware includes, but is not limited to, memory, memory controllers, storage devices, digital signal processors (DSPs), media access adapters, digital to analog converters (DACs), analog to digital converters (ADCs), and Input/Output (I/O) controllers. Firmware 170 comprises software components stored in non-volatile memory such as, but not limited to, read-only memory (ROM), programmable read-only memory (PROM), electrically erasable programmable read-only memory (EEPROM), and flash memory. Non-volatile memory has the advantage of being unaffected by damage to volatile memory and mass storage, and the software and data contained therein. Non-volatile memory has the disadvantage of providing a relatively small amount of storage compared to volatile memory and mass storage. Firmware 170 includes a Basic Input/Output System (BIOS) 180 that are the computer instructions that enable a computing device to perform functions used to initialize the computing device's hardware when power is first applied after which the BIOS 180 boots the operating system 100. Within the BIOS 180 of a computing device that is ACPI-compliant is an ACPI BIOS 190 containing ACPI tables.

The operating system 100 of a computing device often includes a power manager 130, usually residing in an operating system kernel 110, that may control the levels of certain processor characteristics, such as but not limited to, voltage and frequency. A power manager 130 may be thought of as the "brains" of the power management function of a computing device. A processor driver 140 may be used to abstract the differences in specific controls between various processors, and to execute state transitions that cause changes in a processor's voltage and/or frequency levels. Also residing in the operating system kernel 110, processor drivers 140 may be thought of as the "muscle" of the power management function. Processor drivers 140 read the data included in an ACPI BIOS 190 to discover the power management capabilities of a processor and inform the kernel of these capabilities. With the aid of a power manager 130, a kernel 110 selects a state and informs a processor driver 140 to inform a processor component 210 to transition to that state. The ACPI specification describes an interface, including a language described below, that is used to communicate between a processor driver 140 and an ACPI BIOS 190. The ACPI BIOS 190 provides data that a processor driver 140 reads to assess the power management capabilities of a processor component 210.

Typically, when a computing device is powered up, the computing device's BIOS conducts a hardware check, called a Power-On Self Test (POST), to determine whether the support hardware is present and working correctly. Then the instructions in the BIOS direct control to a boot loader that loads the operating system into a computing device's volatile memory, e.g., a bank of random access memory (RAM) memory devices. The BIOS is located in non-volatile memory to ensure that the BIOS is always available and will not be damaged by failures affecting volatile memory or mass data storage. A BIOS also provides low-level input/output control. For example, in a PC, the BIOS contains the computer instructions required to control the keyboard, display screen, disk drives, serial communications, and a plurality of miscellaneous functions. A typical implementation of a BIOS is a PC BIOS, i.e., the BIOS used in a variety of PCs. Other implementations of a BIOS include, but are not limited to, the Open Firmware (OFW) and Open Boot PROM (OBP). In the discussion herein, the term "BIOS" should be construed as exemplary and not limiting.

Figure 2:
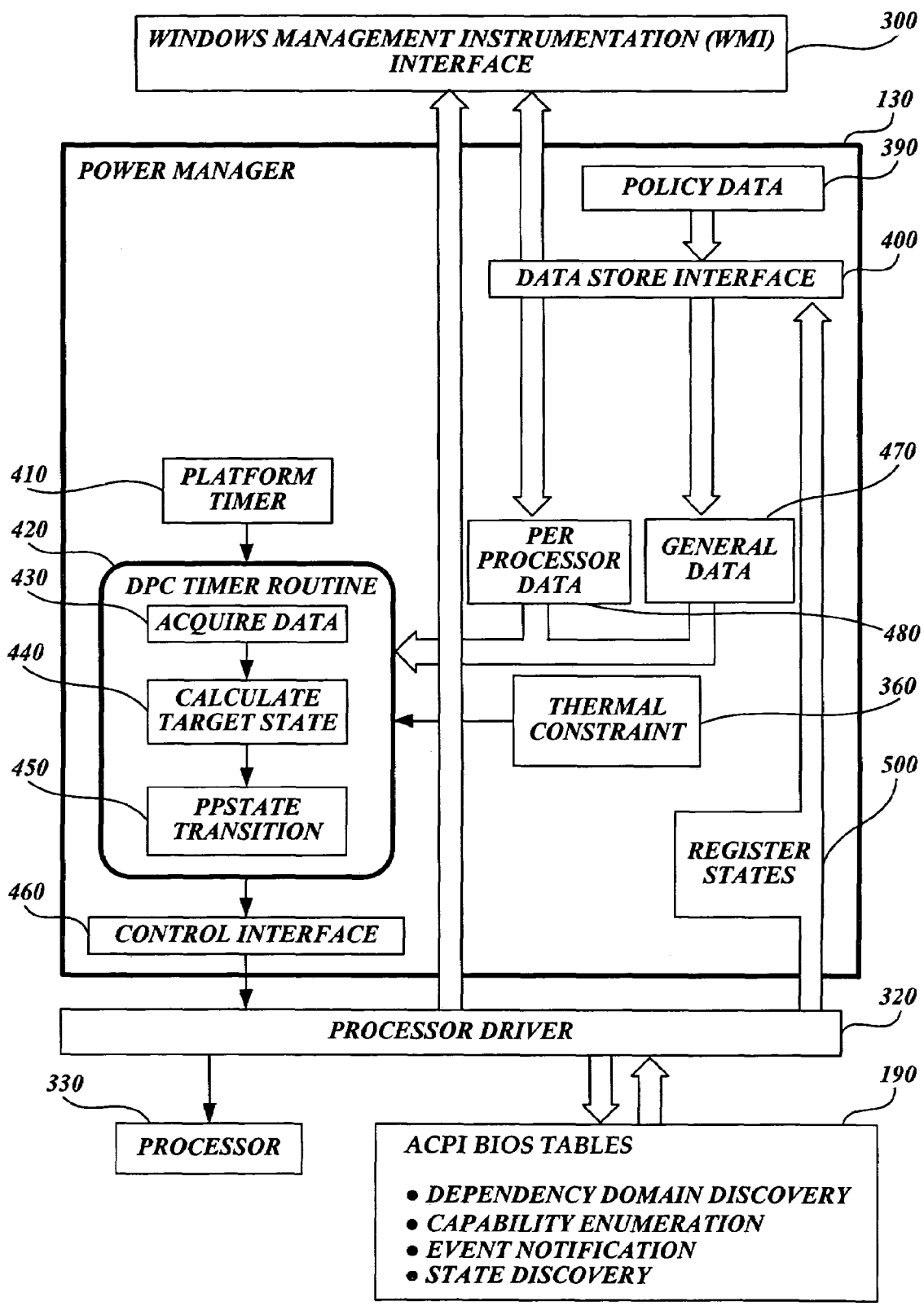
FIG. 2 is a block diagram showing the control flow and data flow within an exemplary power manager managing an exemplary processor through an exemplary processor driver.

FIG. 2 is a block diagram illustrating how the software components of the power manager 130, e.g., a Windows power manager, interact with other components of the operating system 100 and components of the platform 160. In particular, FIG. 2 illustrates the functional elements of the power manager 130 and how data and control flows between software components in and around the power manager 130. Data flows are indicated by open white arrows and control flows are indicated by simple black arrows.

One data flow software component of the power manager 130 is a data store interface 400. The data store interface 400 is used to write data to and read data from a plurality of data sources accessible to the operating system 100 and the power manager 130. The data store interface 400 provides a common interface to a plurality of data sources that store data such as, but not limited to, user settable parameters. An open white arrow (data flow) connects the data store interface 400 to a Windows Management Instrumentation (WMI) interface 300, thereby indicating that data flows from the kernel power manager 130 to the WMI interface 300. The WMI interface 300 enables operating system software components to monitor, command, and control software components using events. A black arrow (control flow) also connects the processor driver 400 to the WMI interface 300, indicating that the processor driver 400 also sends events to the WMI interface 300.

Data flows into the data store interface 400 from the policy data 390. A processor object, i.e., PO, is a software component that describes the capabilities of a particular type or family of processors. An IRP, i.e., I/O Request Packet, is an object used by an operating system to pass information from one software component to another. Thermal constraints 360 are values that are imposed by a system that may be running temporarily above a prescribed thermal threshold set by system designers. Users may also set individual power preferences which are stored as power policy data 370.

The data store interface 400 provides per processor data 480, i.e., processor type specific data, and general data 470, i.e., system specific data. For example, the data store interface 400 provides per processor data 480 for processor 330. The processor 330 is an exemplary processor component similar to processor component 210 illustrated in FIG. 1 and described above. Thus, processor 330 may be replaced by a core in a processor, a plurality of processors, a plurality of cores in a processor, or a plurality of cores in a plurality of processors. Hence, the use of a single processor, e.g., processor 330, in conjunction with the power manager 130 should be construed as exemplary and not limiting.

The data store interface 400 provides per processor data 480 and general data 470 to a target performance state calculation engine that runs in the context of a DPC (Deferred Procedure Call) timer routine 420. The DPC timer routine 420 is invoked by the expiration of a platform timer 410. A deferred procedure call (DPC) is a software construct provided by an operating system to allow work to be postponed, or queued for later execution at a reduced Interrupt Request Level (IRQL). The platform timer 410 provides convenient and consistent timing of events. The DPC timer routine 420 in the power manager 130 is a processor target performance state engine comprising three functional blocks. At the first block 430, data is acquired. At block 440, the target state, i.e., the desired performance state of the processor, is calculated. At the last block 450, a PState transition, i.e., processor performance state transition; is initiated by selecting a control mask for the processor 330 and a control value for the PState for the processor 330. The control mask and control value are passed to the control interface 460 ending the calculation by DPC timer routine 420, i.e., the target performance state calculation engine. The control interface 460 passes the control mask and control value to the processor driver 320. The processor driver 320 uses the control mask and the control value to set the PState in the processor 330.

Typically, a PState for a processor is set by using a model-specific register (MSR) in the processor. An MSR is a register in a processor that controls the values of processor characteristics such as, but not limited to, memory range, memory type, oscillator clock frequency, and operating voltage. A value stored in a MSR is used to control one or more processor characteristics. For example, some bits in the MSR may used to control the operating voltage. The availability and function of an MSR or set of MSRs is specific to a particular family of processors or model of processor, hence the name "model-specific register." The processor driver 320 may also read an MSR and pass the data to the data store interface 400. For example, registers, i.e., MSRs 500 may be read by the processor driver. Each bit in an MSR is expensive to implement so the bits must be used efficiently. A way to use the bits efficiently is to use bit masks, i.e., masks. For example, within an MSR that has 64 bits, only eight bits might be used for the control value to transition the processor to a new PState. The eight bits may be contiguous, e.g., bits 2-9, or the eight bits may be non-contiguous, e.g., bits 2-5 and 16-19. A mask allows a platform to inform a processor driver which bits are relevant, i.e., which bits should be ignored or preserved, during a particular operation, e.g., setting the PState in a processor.

The processor driver 320 also exchanges data with the ACPI BIOS 190. The ACPI BIOS 190 contains data in tables pertaining to dependency domain discovery, capability enumeration, event notification, and state discovery. Data in an ACPI BIOS 190 is used during the initialization and operation of the power manager 130. Dependency domain discovery data describes the dependencies between the cores of a plurality of processor cores or the processors of a plurality of computing device processors when the frequency and/or voltage of one or more cores or processors is changed. Capability enumeration data describes the capability of a processor or core to modify frequency and voltage. Event notification data describes what events may have occurred in the system that require an update of the operating system's use of power management features, such as when a laptop system transitions from an AC (utility) power source to DC (battery) power. State discovery data describes-the performance states, linear clock throttle states, or processor idle sleep states available in a processor or core. For example, one processor may have available three voltage states, i.e., three voltage levels, and another processor may have available five voltage states. Collecting the dependency domain discovery, capability enumeration, event notification, and state discovery data from an ACPI BIOS 190 during initialization allows a power manager 130 to later use the data to set the states available on a processor or core.

ACPI compliant systems present a processor performance state control interface described by the ACPI specification. The data in a processor's performance control interface is retrieved from an ACPI BIOS 190 from two objects: _PCT and _PSS. _PCT stores a processor's control and status registers. _PSS stores one or more performance state descriptions. A performance state is a set of frequency and voltage values describing a particular level of processor performance. For example, a performance state describes the levels of power related performance. An exemplary set of performance states may be labeled P0 through P4 with P0 indicating the highest available or allowable power level. A performance state is defined as controlling both voltage and frequency to achieve a non-linear reduction in power consumption. The processor driver 320 evaluates the ACPI _PCT and _PSS methods and passes the relevant data to the kernel power manager 130. The processor driver 320 may create or filter additional data before passing a set of states to the kernel power manager. ACPI methods are software functions written in ACPI Source Language (ASL). Computer code written in ASL is compiled into ACPI Machine Language (AML) by an AML compiler. The code produced by the AML compiler is executed by the operating system's ACPI interpreter 150. AML is a binary pseudo-code. ASL is written by humans and compiled into AML that is read by a software program, e.g., the ACPI interpreter 150, in order to discover, among other things, a system's capabilities, e.g., power management capabilities.

ASL includes a plurality of operators that are translated into AML binary pseudo-code. When the ACPI interpreter 150 encounters an operator in the AML binary pseudo-code, the interpreter executes the operator. The action performed by the ACPI interpreter 150 when executing an ASL (AML) operator often involves allocating memory for storing an object and entering data into the object. Name and Package are two such ASL operators. The Name and Package operators are used in the ACPI objects described below that are used by the power manager 130. The Package operator is used to create an array of objects. In ASL a object may contain other objects. For example, an object may contain an array of objects. The Name operator is used to apply a name to an object such as an object containing an array of objects.

As noted above, two object types are used by the kernel power manager 130: _PCT and _PSS. _PCT comprises two address fields. The first address field refers to the processor's Performance Control Register (PERF_CNTL). The second address field refers to the processor's Performance Status Register (PERF_STATUS). After a _PCT object is evaluated by an ACPI interpreter 150, on behalf of a processor driver 320, the processor driver reads the first address field and uses the address to read from or write to a processor's PERF_CNTL. Similarly, the processor driver 320 reads from a processor's PERF_STATUS pointed to by the second address field. A detailed description of _PCT can be found in the ACPI 2.0 specification.

Figure 3:
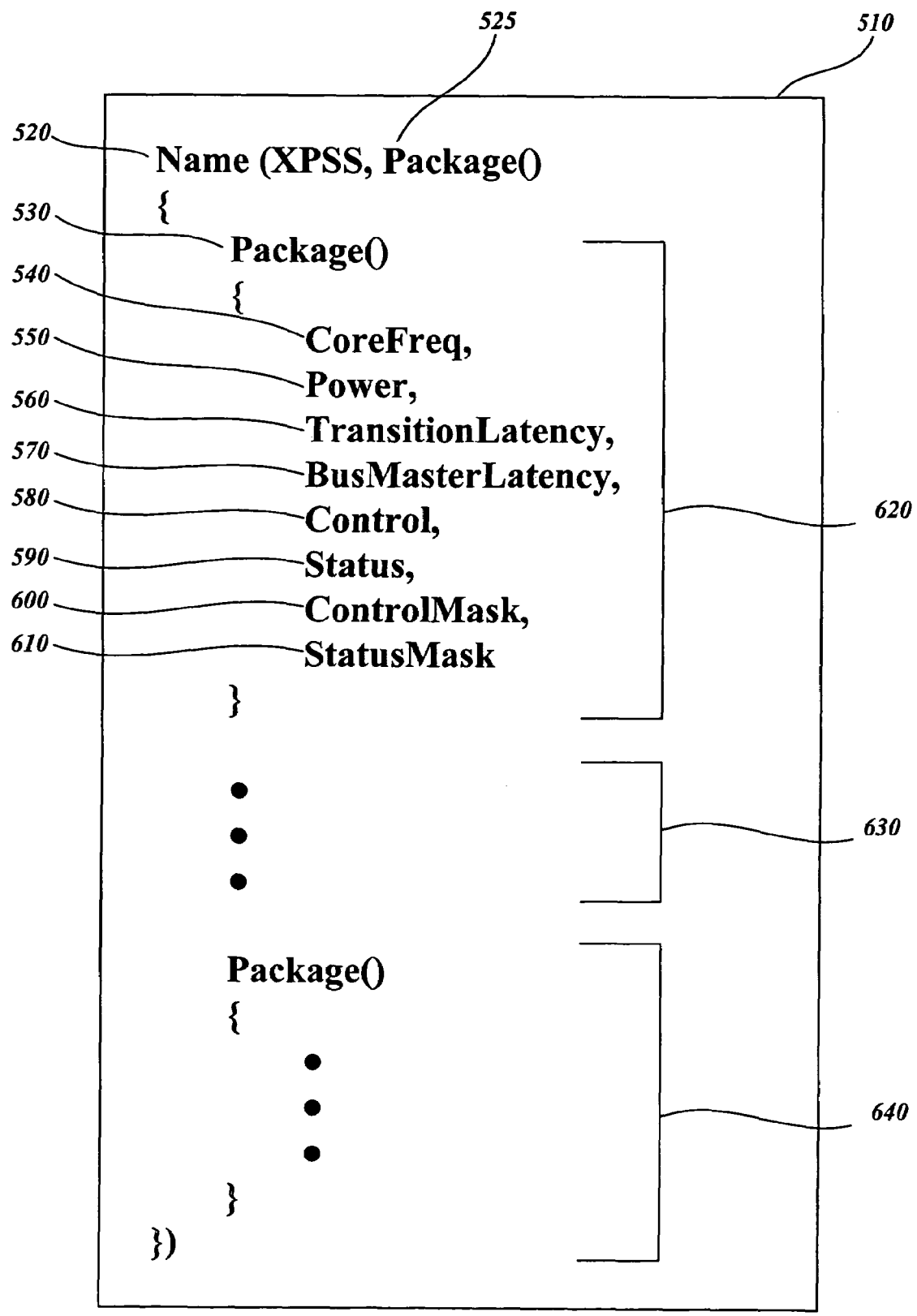
FIG. 3 is an exemplary ACPI object that describes an exemplary processor performance state.

XPSS is based on the _PSS object type described in the ACPI 2.0 specification but XPSS differs from _PSS in that XPSS has features that enable an operating system 100 to use one generic processor driver 320 instead of a plurality of specific drivers, while still the operating system to use processor-specific controls, such as MSRs, to invoke performance state transitions. Typically, an XPSS object 510 contains a plurality of performance state descriptions, each having the same format, i.e., the same object type. FIG. 3 illustrates an exemplary XPSS object 510 containing a plurality of exemplary performance state descriptions each having the same format. For example, the XPSS object 510 may contain five performance state descriptions: performance state description 620; three performance state descriptions 630; and a final performance state description 640. Each of the five performance state descriptions has the same format, i.e., the format of the first performance state description 620.

The XPSS object 510 shown in FIG. 3 begins with the Name operator 520. The Name operator 520 has two parameters, a name and a object with which the name is associated. The parameters are enclosed by opening and closing parentheses. The opening parenthesis is placed after the Name operator 520. The closing parenthesis is placed after the object. In the exemplary XPSS object 510, the closing parenthesis is the last character in the last line. The name parameter in the Name operator 520 is "XPSS." The object is an "outer" Package 525. The outer Package 525 has no parameters and so is followed by a pair of parentheses. The contents of the outer Package 525 are delimited by an opening bracket "{" on the second line of the XPSS object 510 and closing bracket "}" in the first position in the last line of the XPSS object 510. The contents of the outer Package 525 is a plurality of "inner" Packages, one Package for each performance state description. In the example described above, the outer Package 525 would contain five inner Packages. The inner Packages have no parameters. For example, inner Package 530 has no parameters. The contents of each of the inner Packages are delimited by an opening bracket and a closing bracket. For example, the contents of the inner Package 530 are delimited by an opening bracket on the fourth line of the XPSS object and a closing bracket on last line of the performance state description 620. The contents of each of the inner Packages comprise a set of variables, i.e., the set of variables of the inner Package 530. The variables of the inner Package 530 are CoreFreq 540, Power 550, TransitionLatency 560, BusMasterLatency 570, Control 580, Status 590, ControlMask 600, and StatusMask 610. CoreFreq 540 is a double word (32 bits) specifying the core operating frequency of a processor performance state in megahertz. Power 550 is a double word specifying the typical power dissipation of a performance state in milliwatts. TransitionLatency 560 is a double word specifying, in microseconds, the worst case transition latency of a performance state in microseconds, i.e., the period of time in which a processor is unavailable to do useful work during a state transition. BusMasterLatency 570 is a double word specifying the worst case latency, in microseconds, of a bus master transaction, i.e., the period of time in which a (memory) bus master is prevented from accessing memory during a state transition. Control 580 specifies the value to be written to a Performance Control (PERF_CTRL) register. In an XPSS object, Control 580 is a quad word (64 bits). In a _PSS object, Control 580 is a double word. Status 590 specifies the value to be written to a Performance Status (PERF_STATUS) register. In an XPSS object, Status 590 is a quad word (64 bits). In a _PSS object, Status 590 is a double word. The control mask field ControlMask 600 is a quad word specifying a binary mask that is applied the value read from the PERF_CTRL register during a read/modify/write action to transition to a performance state. The control mask field, i.e., ControlMask 600, is not included in a _PSS object. The status mask field StatusMask 610 is a quad word specifying a binary mask that is applied the value read from the PERF_STATUS register during a read/modify/write action to transition to a performance state. The status mask field, i.e., StatusMask 610, is not included in a _PSS object. Since not all processors are able to provide status data, providing a status mask field, e.g., StatusMask 610, may be optional.

Status data may or may not be defined for a processor, or may not be usable by an operating system. Status data may not be defined for a processor because there may be no reliable amount of time to elapse after which a reliable reading can be acquired. For example, electrical characteristics, e.g., frequency and voltage, must stabilize before a performance state transition actually occurs, and a reliable status reading can be taken. If status data is normally available for a processor, the status mask field, i.e., StatusMask 610, is available. If StatusMask 610 is not available, StatusMask 610 is set to null. If the power manager 130 detects that StatusMask 610 is not null, i.e., that a status mask is available, the power manager 130 uses the StatusMask 610 to assess the status of the processor, e.g., assess if the appropriate state has been set.

Note that, as described above, the Control 580, Status 590, ControlMask 600, and StatusMask 610 variables differentiate an XPSS object from a _PSS object. In the exemplary XPSS object described herein, the Control 580 and Status 590 variables are quad words. In a _PSS object, the Control and Status variables are double words. Further, the ControlMask 600 and StatusMask 610 variables exist in XPSS objects, but not in _PSS objects. By providing quad word Control 580 and Status 590 variables and quad word ControlMask 600 and StatusMask 610 variables that read from and write to the Control 580 and Status 590 variables, an ACPI based interface is provided that enables a kernel to use one generic processor driver to control power management for a plurality of processor types, but still take advantage of using processor-specific controls, such as MSRs.

Figure 4:
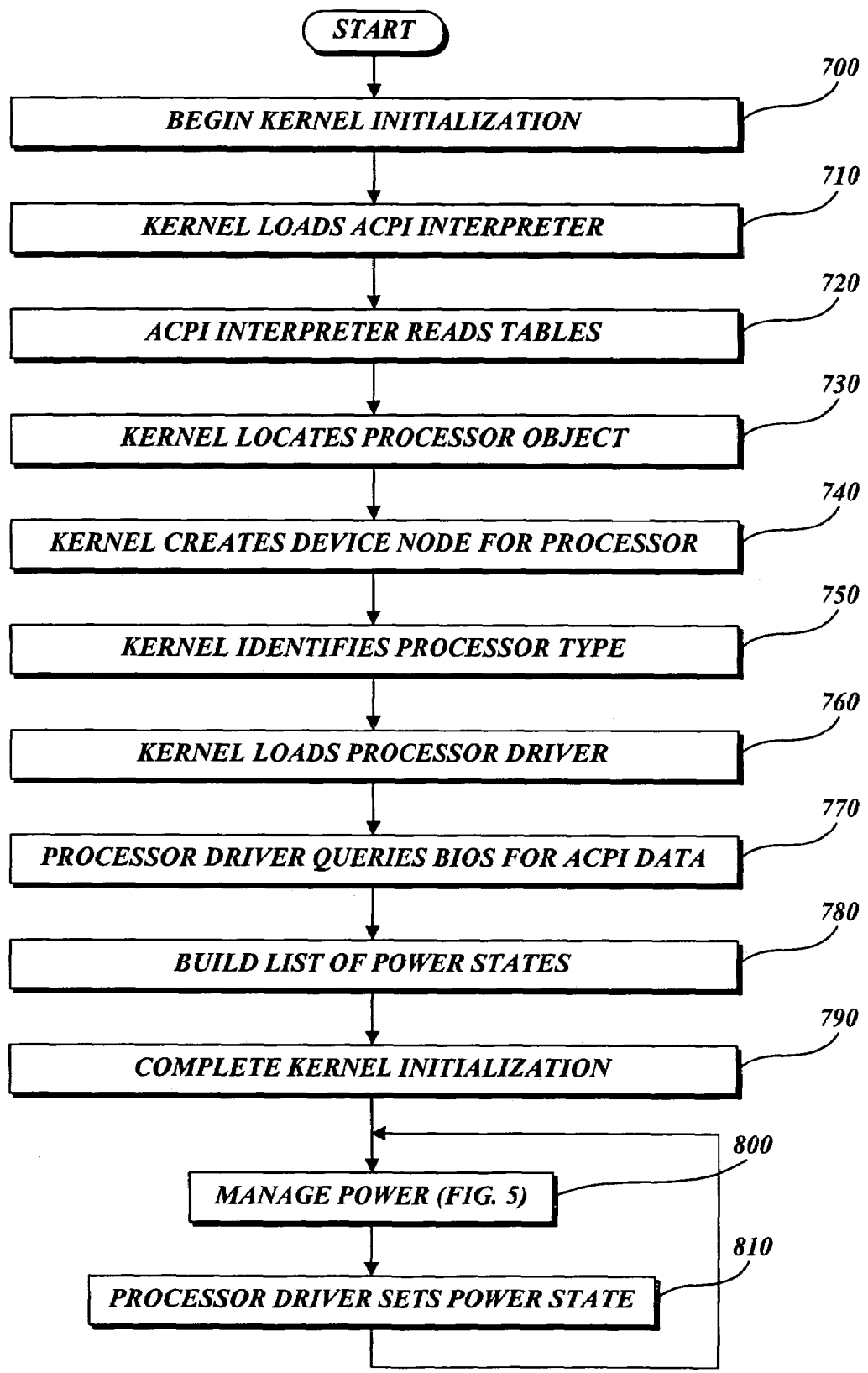
FIG. 4 is a functional flow diagram of an exemplary operating system initialization and operation sequence in which a power manager is initialized and a power management sequence is executed.
Figure 5:
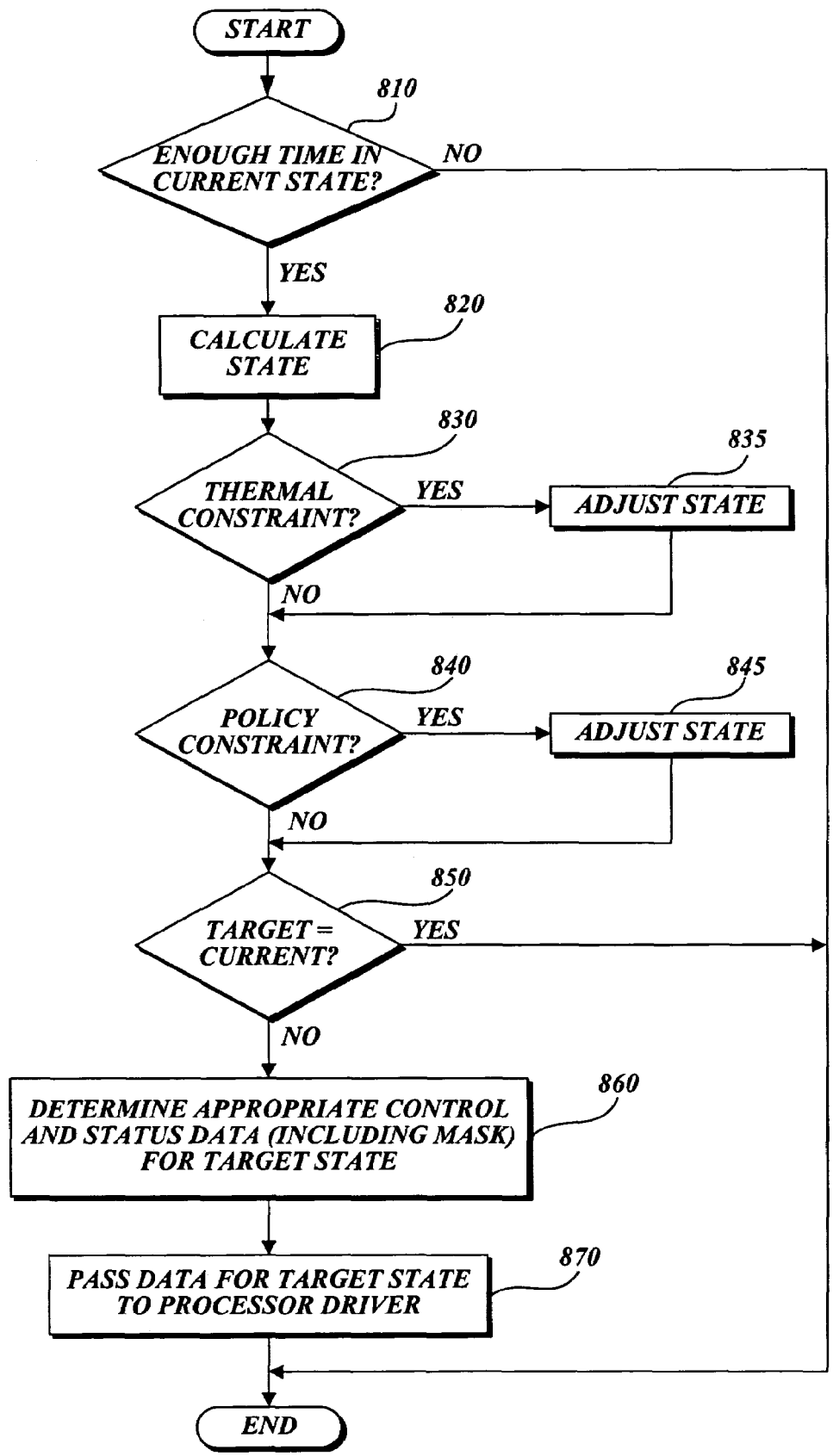
FIG. 5 is a functional flow diagram of an exemplary power management sequence.

How an XPSS object is used by a kernel to control power management for a plurality of processor types is shown in FIGS. 4 and 5 and described below. FIG. 4 is a functional flow diagram showing how, during operating system initialization, an exemplary kernel prepares an ACPI interpreter, a power manager, and a processor driver to manage power. FIG. 5 is a functional flow diagram showing how a power manager, using a processor driver, manages power.

In FIG. 4, at block 700, an exemplary kernel 110 begins initializing a plurality of software components including, but not limited to, the software components involved in power management, e.g., ACPI interpreter 150. To begin power management initialization, the kernel 110 loads an ACPI interpreter 150 at block 710. At block 720, the ACPI interpreter reads the ACPI tables in the ACPI BIOS 190. At block 730, the kernel 110 locates a reference to a processor object in the ACPI tables. The reference to the processor object is predefined by the ACPI specification so that kernels, e.g., kernel 110, have a single, reliable reference to a processor object. The processor object contains data that identifies a particular processor type. At block 740, the kernel 110 creates a device node for the processor. The device node is a data structure, i.e., object, that contains information for various types of devices, e.g., a processor object. The kernel 110 uses the processor object reference to locate the processor object in the ACPI BIOS 190 tables. The kernel 110 reads the information from the processor object and loads the information from the processor object into the device node. A block 750, the kernel 110 uses the information in the device node, that was loaded from the processor object, to identify the processor type. The kernel 110 uses the processor type to locate an appropriate device driver, i.e., processor driver, contained within the plurality of device drivers contained in the operating system 100, for the processor 330. At block 760, the kernel 110 loads the appropriate, i.e., generic or type-specific, processor driver 320 into operating system memory.

Traditionally, at this point in the initialization process, i.e., block 760, a processor driver 320 for a specific processor type is loaded, i.e., a type-specific processor driver. A type-specific processor driver contains specific, and often proprietary, data, i.e., type-specific data including data concerning power management. Processor designers must provide type-specific data to enable the operating system designers to create appropriate, i.e., type-specific, processor drivers. This requires an operating system 100 to contain a plurality of processor drivers 140. If processor designers change type-specific data, operating system designers must update type-specific processor drivers with the new data.

By using an XPSS object 510 of the type shown in FIG. 3 and described above, an operating system 100 requires only one generic processor driver because the type-specific data is included in the tables in the ACPI BIOS 190 and not in a type-specific processor driver. Using an XPSS object 510 allows power management state transitions to be invoked using proprietary processor controls, or MSRs, without requiring a type specific processor driver. If a processor type does not conform to the XPSS approach, the processor type may still be handled using a type-specific processor driver if the appropriate type-specific processor driver is available.

Referring to FIG. 4, at block 770, after the processor driver 320 is loaded, the kernel 110 uses the processor driver 320 to query the ACPI BIOS 190 for data describing the capabilities of the processor. The processor capabilities data includes data that describes the power management capabilities of the processor, including but not limited to, data that describes the performance states of the processor and control data about how to transition from one performance state to another.

A performance state is a combination of voltage and frequency values in which higher voltages and frequencies provide higher processor performance but also cause a processor to consume more power. Contrarily, lower voltages and frequencies provide lower processor performance but also cause a processor to consume less power. The processor driver 320 submits the capabilities data to the power manager 130. At block 780, the power manager 130 uses the capabilities data to build a list of performance states. At block 790, the kernel initialization begun at block 700 is completed. The initialized operating system 100 and kernel 110 begin normal operation, including power management. At block 800, the kernel 110, using the power manager, manages power by calculating the next power state, as shown in detail in FIG. 5. At block 810, the next performance state is set, if needed. Throughout the normal operation of the kernel 110, this cycle of calculating a performance state and setting the performance state when needed is repeated.

FIG. 5 is a functional flow diagram of an exemplary power management sequence, i.e., a transition from one performance state to another performance state. A performance state transition is most commonly based on current computing device conditions and/or requirements, and power policy. Or, if the operating temperature of a processor 330 is too hot, a thermal event may be posted. The power manager 130 responds to the thermal event using a thermal event policy. The power manager 130 may set a new state, e.g., a lower power state, causing the processor 330 to run more slowly, consume less power, and thus cool down, or the power manager may turn on a cooling fan, depending on thermal event policy.

The power management process begins as follows. A platform timer 410 counts down a predetermined amount of time, e.g., 100 milliseconds. After the predetermined amount of time has expired, the platform timer 410 causes the DPC routine 420 to execute. At block 810, the power manager uses the currently active power policy to determine if enough time has been spent in the current state to warrant promoting, or demoting, the current state to a new target state. If enough time has elapsed in the current state, as dictated by the currently active power policy, the control flows to block 820. If not enough time has elapsed in the current state, the process ends. When the platform timer 410 expires once again the power management sequence begins again.

At block 820, the power manager 130 calculates the target performance state based on CPU utilization since the last time the calculation routine has run. For example, the power manager 130 may determine that for the previous five DPC timer cycles, the processor has been operating at, or nearly at, 100 percent of the computing capacity the processor at the voltage and frequency setting. Based on this information, a policy in the power manager 130 may determine that the processor voltage and frequency should be increased to increase the available computing capacity. The power manager 130 determines what performance state provides the required level of computing capacity. At block 830 it is determined if a thermal constraint has been exceeded. If a thermal constraint has been exceeded, control flows to block 835. At block 835 the target state, i.e., target performance state, is adjusted in accordance with thermal policy. If a thermal constraint has not been exceeded, control flows to block 840. At block 840, it is determined if a policy constraint has been exceeded. If a policy constraint has been exceeded, control flows to block 845. At block 845, the target state, i.e., target performance state, is adjusted in accordance with current user power policy. If a policy constraint has not been exceeded, control flows to block 850. At block 850, the power manager determines if the target state is the same as the current state. If the target state is not the same as the current state, the control flows to block 860. If the target state is the same as the current state, the process ends. When the platform timer 410 expires once again the power management sequence begins again.

At block 860, the power manager 130 determines the appropriate control and status data (including mask) for the target state by reading the appropriate fields from the processor object that describe the desired, i.e., target state, of the processor 330. The control value data is read from the control value field, i.e., the Control 580 and the control mask is read from the control mask field, i.e., the ControlMask 600. Since not all processors are able to provide status data, status data is optional. If status data is available in the processor object, the status value data is read from the status value field, i.e., the Status 590; and the status mask data is read from the status mask field, i.e., and StatusMask 610.

At block 870, the power manager 130 passes data for the target state to the processor driver 320, i.e., passes the control mask data and control value data to the generic processor driver. If status data is available in the processor object, the processor driver 320 passes status mask data and status value data to the generic processor driver. In FIG. 4, at block 810, the processor driver 320, then sets the performance state in the processor 330. Thereafter, the process illustrated in FIG. 5 ends.

While illustrative embodiments have been illustrated and described, it will be appreciated that various changes can be made therein without departing from the spirit and scope of the invention. For example, a power manager may respond to events not described above.

The embodiments of the invention in which an exclusive property or privilege is claimed are defined as follows:

1. A method of managing processor, i.e., processor component, power using a generic processor driver BIOS interface, the method comprising:
    (a) storing processor objects each associated with a type of processor, the processor objects including data that describes processor power management policies of the associated type of processor, the processor objects containing a control mask field and a control value field;
    (b) identifying a processor component;
    (c) selecting the processor object associated with the identified processor component;
    (d) loading a generic processor driver; and
    (e) in response to a power management event:
        (i) calculating a desired state of the processor component;
        (ii) reading control value data for the desired state of the processor component from the control value field in the selected processor object;
        (iii) reading control mask data from the control mask field in the selected processor object; and
        (iv) passing the control mask data and control value data to the generic processor driver.

2. The method of claim 1 wherein the processor power management policies describe a power consumption of the processor component as controlled by a processor characteristic.

3. The method of claim 2 wherein the processor characteristic is voltage.

4. The method of claim 2 wherein the processor characteristic is frequency.

5. The method of claim 1 wherein the processor power management policies describe an operating temperature of the processor component as controlled by a processor characteristic.

6. The method of claim 5 wherein the processor characteristic is voltage.

7. The method of claim 5 wherein the processor characteristic is frequency.

8. The method of claim 1 wherein:
    (a) the processor objects also contain a status value field and a status mask field; and
    (b) in response to a power management event further comprises:
        (i) reading status value data from the status value field and status mask data from the status mask field that together describe an expected status of the processor component; and
        (ii) passing the status value data and status mask data to the generic processor driver.

9. The method of claim 1 wherein the processor component is a plurality of similar processors.

10. The method of claim 1 wherein the processor component is a plurality of similar processor cores.

11. A computer-storage medium having stored thereon a data structure including an ACPI XPSS object with a Control quad word variable used to control performance of a processor when written to a register of the processor and a Status quad word variable and a ControlMask variable of quad word length.

12. The computer-storage medium of claim 11, wherein the ACPI XPSS object further comprises a StatusMask variable of quad word length.

13. A computer-storage medium encoded with computer executable instructions that, when executed on a computer, perform a method for managing processor, i.e., processor component, power using a generic processor driver, the method comprising acts of:
    (a) storing processor objects each associated with a type of processor, the processor objects including data that describes processor power management policies of the associated type of processor, the processor objects containing a control mask field and a control value field;
    (b) identifying a processor component;
    (c) selecting the processor object associated with the identified processor component;
    (d) loading a generic processor driver; and
    (e) in response to a power management event:
        (i) calculating a desired state of the processor component;
        (ii) reading control value data for the desired state of the processor component from the control value field in the selected processor object;
        (iii) reading control mask data from the control mask field in the selected processor object; and
        (iv) passing the control mask data and control value data to the generic processor driver.

14. The computer-storage medium of claim 13 wherein the processor power management policies describe the power consumption of the processor component as controlled by a processor characteristic.

15. The computer-storage medium of claim 14 wherein the processor characteristic is voltage.

16. The computer-storage medium of claim 14 wherein the processor characteristic is frequency.

17. The computer-storage medium of claim 11 wherein the power management policies describe an operating temperature of the processor component as controlled by a processor characteristic.

18. The computer-storage medium of claim 17 wherein the processor characteristic is voltage.

19. The computer-storage medium of claim 17 wherein the processor characteristic is frequency.

20. The computer-storage medium of claim 13 wherein the processor component is a plurality of similar processors.

* * * * *